(12) United States Patent
Chen et al.

(10) Patent No.: US 9,405,073 B2
(45) Date of Patent: Aug. 2, 2016

(54) FIBER ASSEMBLY FOR FACET OPTICAL COUPLING

(71) Applicant: ACACIA COMMUNICATIONS INC., Maynard, MA (US)

(72) Inventors: Long Chen, Maynard, MA (US); Christopher Doerr, Maynard, MA (US); Diedrik Vermeulen, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/475,509

(22) Filed: Sep. 2, 2014

(65) Prior Publication Data

US 2015/0063747 A1  Mar. 5, 2015

Related U.S. Application Data

(60) Provisional application No. 61/872,660, filed on Aug. 31, 2013.

(51) Int. Cl.
  *G02B 6/36*  (2006.01)
  *G02B 6/38*  (2006.01)
  *G02B 6/43*  (2006.01)

(52) U.S. Cl.
  CPC ............ *G02B 6/3636* (2013.01); *G02B 6/3839* (2013.01); *G02B 6/43* (2013.01)

(58) Field of Classification Search
  CPC ............................ G02B 3/3636; G02B 3/3839
  USPC ....................................................... 385/65, 83
  See application file for complete search history.

(56) References Cited

U.S. PATENT DOCUMENTS

| 6,866,426 | B1 * | 3/2005 | Steinberg et al. ............... 385/83 |
| 2004/0042729 | A1 | 3/2004 | Zhou et al. |
| 2009/0022457 | A1 * | 1/2009 | de Jong ................ G02B 6/3846 385/96 |

FOREIGN PATENT DOCUMENTS

| JP | 53010445 A * | 1/1978 | ............... G02B 5/16 |
| WO | WO 02079831 A1 * | 10/2002 | ............... G02B 6/36 |

* cited by examiner

*Primary Examiner* — Ryan Lepisto
(74) *Attorney, Agent, or Firm* — Wolf, Greenfield & Sacks, P.C.

(57) ABSTRACT

Disclosed are structures and methods for facet optical coupling of optical fibers to photonic integrated circuits.

14 Claims, 6 Drawing Sheets

FIBER ASSEMBLY FOR FACET OPTICAL COUPLING

CROSS REFERENCE TO RELATED APPLICATIONS

This application claims the benefit of U.S. Provisional Patent Application Ser. No. 61/872,660 filed Aug. 31, 2013 which is incorporated by reference in its entirety as if set forth at length herein.

TECHNICAL FIELD

This disclosure relates generally to photonic structures and systems. More particularly, this disclosure pertains to techniques, methods and apparatus for facet coupling applications of optical fiber assemblies.

BACKGROUND

In certain photonic circuits constructed on photonic chips, optical facets of planar waveguides are recessed from the facets of the photonic chip. Consequently, standard prior-art fiber assemblies in which optical fiber facets are aligned with ends of a substrate and lid are not suitable for coupling into such certain photonic circuits. Accordingly, techniques, methods and apparatus for improved facet coupling with to such structures would represent a welcome addition to the art.

SUMMARY

The above problem(s) are solved and an advance in the art is made according to an aspect of the present disclosure directed to structures and methods for precise facet optical coupling of optical fibers to photonic integrated circuits.

Illustrative structures according to the present disclosure include a substrate material including one or more grooves formed in a planar surface of the substrate; an individual optical fiber disposed in each of the one or more grooves, each one of said individual fibers positioned such that an end of the fiber is recessed from the end of the substrate; and a lid overlying the fiber(s) and secured to the substrate such that the fiber(s) are securely held in its respective groove; wherein said fiber assembly is inverted and attached to a photonic chip having an optical facet and a chip facet such that the optical fibers of the assembly are optically coupled to optical fibers on the photonic chip.

Alternative illustrative embodiments according to the present disclosure for a fiber assembly for facet optical coupling include a substrate material including at least one U-groove formed in a planar surface of the substrate; an individual optical fiber disposed the U-groove such that a portion of the optical fiber extends above the planar surface of the substrate; an optical fiber disposed in the U-groove; a fiber v-groove block having a number of grooves formed in a planar surface of the fiber v-groove block wherein one of the grooves is aligned with the U-groove such that the optical fiber is contained within the U-groove and the aligned v-groove when the fiber v-groove block is positioned to overlie the substrate; and a glass alignment rod for positioned in each of the number of grooves not aligned with the U-groove such that a vertical relationship between the fiber v-groove block and the substrate is maintained.

BRIEF DESCRIPTION OF THE DRAWING

A more complete understanding of the present disclosure may be realized by reference to the accompanying drawing in which.

DETAILED DESCRIPTION

Figure 1:
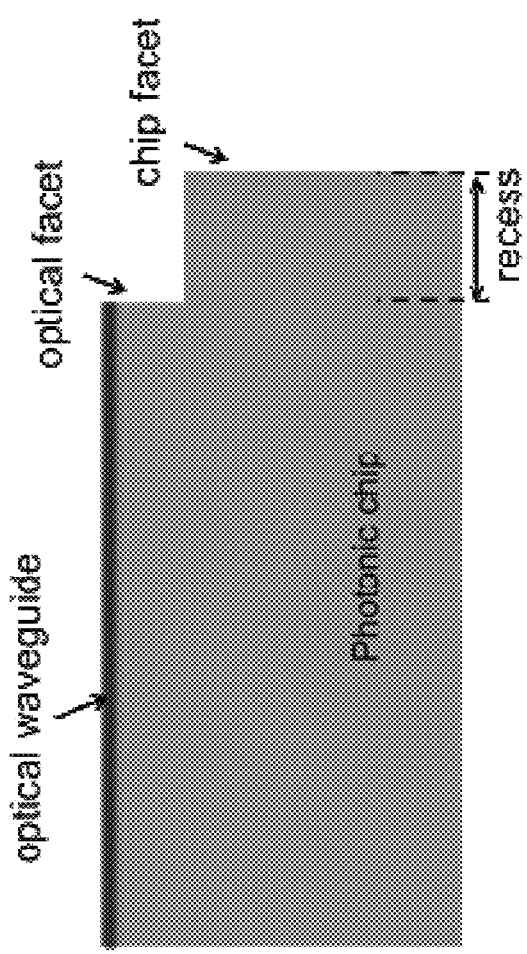
FIG. 1 shows a schematic of an illustrative photonic circuit with planar waveguides in which the facet for optical coupling is recessed from the facet of the chip.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by noting that fiber assemblies having one or more optical fibers arranged in mechanical support structures (for example, substrate(s) with V-grooves) are oftentimes used for optical coupling between planar photonic circuits and the optical fibers. As is known, such assemblies can provide accurate relative placement of fibers, and can be easily attached to photonic chips with transparent adhesives.

Notably, conventional fiber assemblies oftentimes are configured such that the optical fibers are "sandwiched" between a substrate and a lid, the ends of which are aligned perfectly flush with the fibers. With such configurations, the end facet can be either perpendicular to the direction of the fiber, or at certain tilt angle determined by coupling application (for example, commonly used 8° degree).

For facet coupling with such fiber assemblies, the optical waveguides on the photonic chip are positioned such that they are nearly flush with the facet of the chip. For example, the ends of optical waveguides are oftentimes within 20 µm of the chip facet, or in most cases, within 5 µm of the chip facet.

The facet of the fiber assemblies are butted against the facet of the chip and secured with a transparent adhesive such that the center of the fiber cores are aligned with the centers of the optical waveguides with only a small gap in between, so that the optical diffraction loss in the gap is limited. Additional mechanical pieces may be used to enhance the strength of the joint between the fiber assembly and the photonic chip.

In certain configurations however, optical waveguides positioned on a photonic chip are not aligned flush with the chip facet. A schematic illustration of such a configuration is shown in FIG. 1—where the end of the optical waveguide (the optical facet) is recessed from the chip facet. As may be readily appreciated, such a recess can be produced for a number of reasons. For example, in some cases, two separate processes are employed to create the optical facet and chip facet, which causes the recess.

More particularly, the optical facet is created through a lithography and etching process, and has a smooth surface with accurate placement for optical coupling. The chip facet is created through a mechanical dicing process, and has a rough surface and some placement inaccuracy. This recessed configuration then allows a smooth facet for coupling—without having to polish the diced chip facet, and can significantly save time and improve consistency in coupling.

Figure 2:
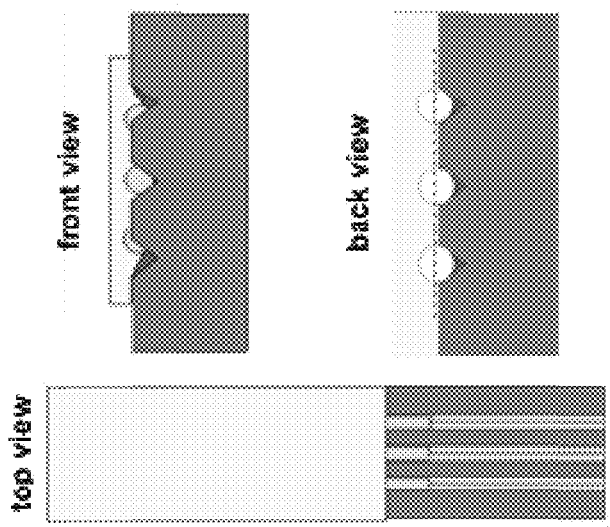
FIG. 2 shows a schematic of an illustrative fiber assembly with an illustrative three-fiber array according to an aspect of the present disclosure.
Figure 2:
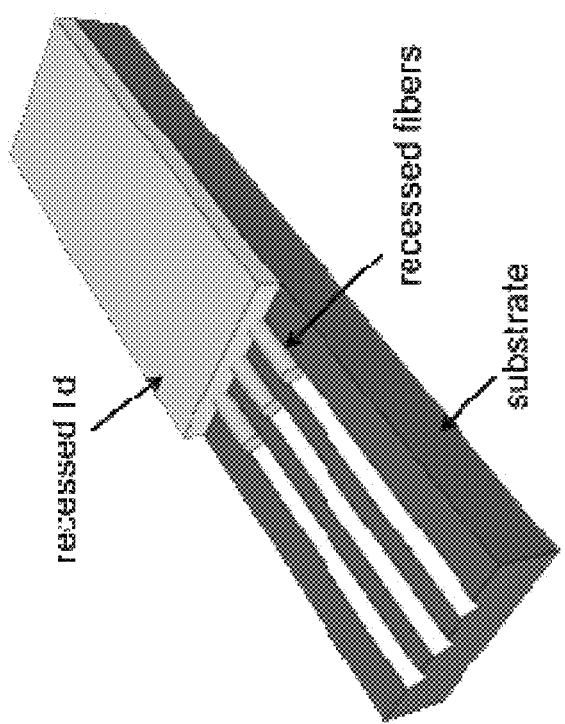

In some other cases, a waveguide positioned near the coupling has mechanically sensitive structures (for example, spot-size-converters with suspended structures) that usually cannot tolerate the dicing or polishing process. Therefore the recessed configuration as shown in FIG. 1 becomes necessary. Since the dicing process usually requires a relatively large clearance (blade width, alignment, and chipping etc.), the recess has to be sufficiently large (20 µm or more). If standard fiber assemblies with the fibers flush with the substrate and lid were used and butted against the chip facet, the large gap between the fibers and the optical facet would result in considerable optical diffraction loss. Consequently—and according to an aspect of the present disclosure—a different design of fiber assemblies is therefore needed Turning now to FIG. 2, there is shown a schematic of an illustrative fiber assembly for coupling to photonic chips with such recessed optical facets according to an aspect of the present disclosure. From a review of that FIG. 2 it may be observed that the illustrative assembly is shown as a three-fiber array shown at different view angles namely, perspective, top, front and back. In sharp contrast to the prior art fiber assembly shown previously, the fiber facets shown illustratively in FIG. 2 are recessed from the end of the substrate holding the fibers, and the lid is further recessed from the fiber facets.

In the configuration shown, the lid presses down on the optical fibers such that they fit tightly into V-grooves formed in the substrate. As a result, the center core of the optical fiber is positioned slightly above the surface of the substrate. The ends of the fiber may be positioned at a same distance along the V-grooves from the front end of the substrate (i.e., aligned in a line perpendicular to the direction of the V-grooves), or can be placed with certain pre-determined relative offsets. To couple to the photonic chip, the fiber assembly can be flipped upside-down and placed directly on top of the photonic chip with optical adhesives.

Figure 3:
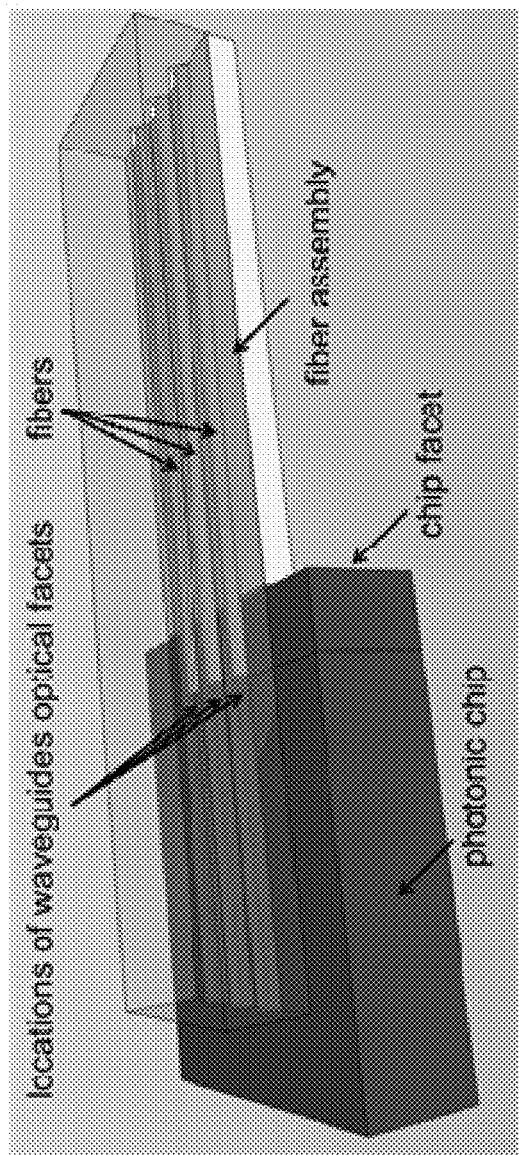
FIG. 3 shows a schematic of an illustrative fiber assembly with a photonic chip wherein the optical facets of the planar waveguides are recessed from the chip facet according to an aspect of the present disclosure.

The coupling concept is illustrated in FIG. 3, which shows an illustrative embodiment according to the present disclosure wherein optical facets of the planar waveguides on the photonic chip are recessed from the chip facet. The bonding between the flat top surface of the photonic chip and the flat top surface of the fiber assembly substrate provides strong mechanical support for the fiber assembly. One requirement is that the trenches in front of the optical facets (between the optical facets and the chip facet) need to be deep enough for part of the optical fibers that are above the substrate of the fiber assembly. Additional features can be created on the photonic chip to aid the alignment between the fiber and the planar waveguides. For example, the trenches can be made into proper shapes and dimensions to mate with the part of the optical fibers that extend above the substrate of the fiber assembly.

Alternative illustrative structures according to the present disclosure are ones that instead of having a substrate extend beyond the fiber facets, the substrate can be flush with the fiber facets, and the configuration of the lid remains similar, i.e., there is no lid, or the lid is recessed from the fiber facets, or only part of the lid is recessed from the fiber facets. These are illustrated in FIG. 4.

Figure 4:
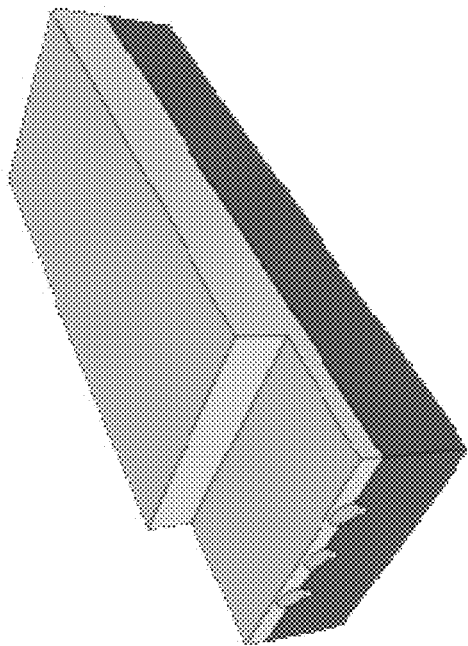
FIG. 4 shows a schematic of another illustrative fiber assembly wherein the substrate is flush with the fiber facets and the lid is either completely or partially recessed from the fiber facets according to an aspect of the present disclosure.
Figure 4:
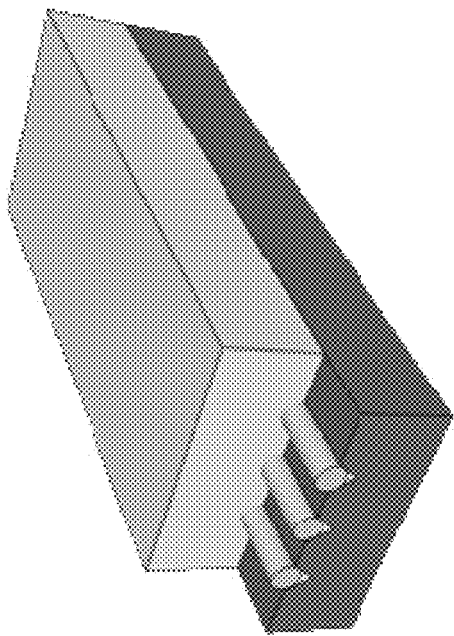

With reference to that FIG. 4, it may be readily understood that the fiber assembly will similarly be flipped upside-down and couple to the photonic chip. The lid may be glued to the chip facet, or additional mechanical structures may be used to hold the fiber assembly and the chip together. There are many different approaches to produce such fiber assembly. For example, for the partially recessed lid shown in the right side of FIG. 4, it can be produced from a standard fiber assembly with part of its lid diced off.

Passive Alignment

As will be readily appreciated by those skilled in the art—for certain optical alignments—a submicron alignment accuracy is necessary. Unfortunately, V-groove block dimensions are suitable up to approximately +−5 micron and thus unsuitable for passive alignment. The V-groove itself on the other hand has a very accurate angle precision, resulting in submicron accuracy of the relative position of fibers or other cylindrical/spherical objects aligned using the V-grooves. Additionally, the diameter of cylindrical objects such as an optical fiber can be fabricated with better than +−1 micron accuracy.

Figure 5:
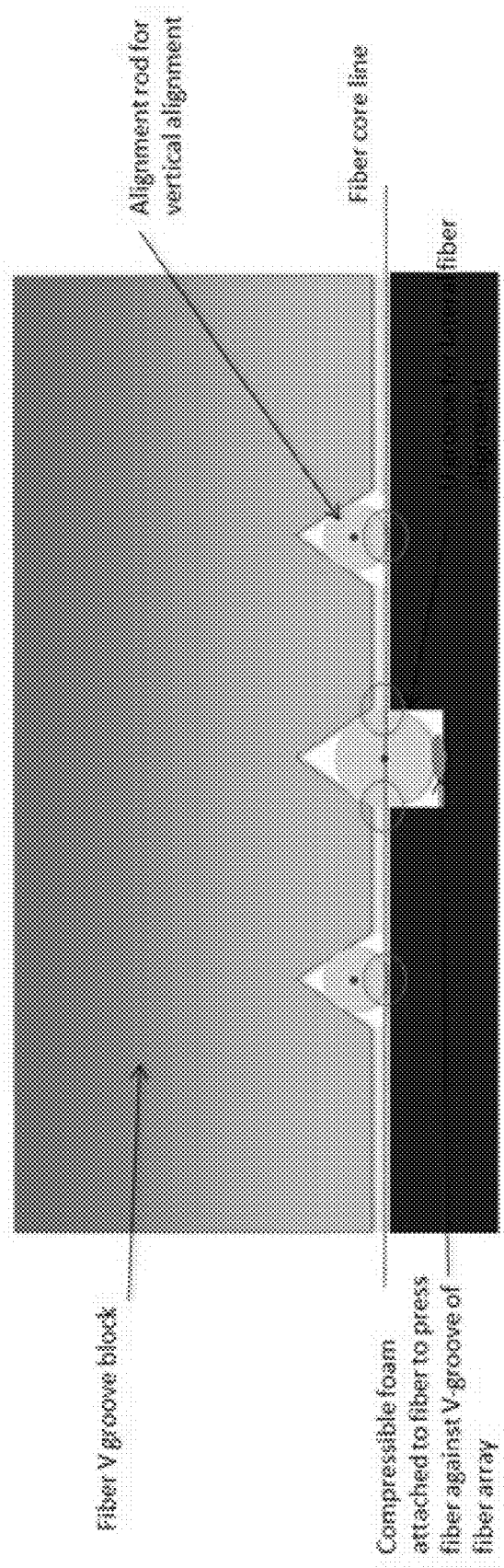
FIG. 5 shows a schematic of an illustrative fiber assembly with a passive alignment of the fiber array with fiber core line out of a V-groove according to an aspect of the present disclosure.

With reference now to FIG. 5, there is shown a passive alignment of a fiber array with fiber core line out of the v-groove according to another aspect of the present disclosure. Advantageously, the fiber array configurations shown and described previously may be advantageously aligned and coupled as illustratively depicted in FIG. 5. With continued reference to that figure, it is noted that the circles emphasize the passive alignment points. With such configurations, lateral alignment is achieved by a U-shaped groove in the chip having a lithographically determined width (+−50 nm width variation). Because the fiber core line below the top surface of the chip, the sidewall of the U-groove can be used as a lateral alignment feature with the fiber.

As may be appreciated, the chip depicted has a number of highly accurate height reference planes, typically within 10 micron of the top surface. The U groove bottom for example can't be used as a height reference because the fabrication tolerances are worse than +−1 micron. As a consequence the fiber bottom or top can't be used for passive alignment since they don't line up with the chip height reference planes. As an alternative—and according to yet another aspect of the present disclosure—a dummy fiber or other type of rod with a smaller diameter, placed in dummy grooves can be used for passive vertical alignment.

Figure 6:
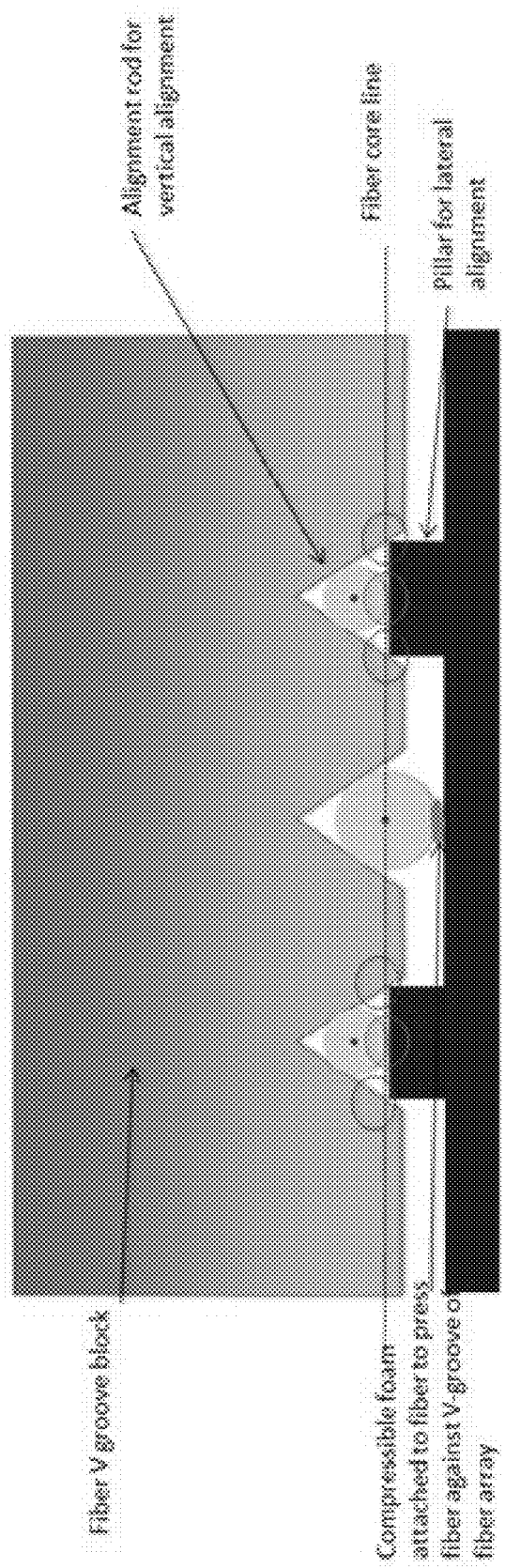
FIG. 6 shows a schematic of an illustrative fiber assembly with a passive alignment of a fiber array with fiber core line in a V-groove according to an aspect of the present disclosure.

As may be readily understood and appreciated, the recessed fibers (fiber array section without lid) will be loose and not height matched. For accurate height matching, the fibers need to be pressed in the V-groove. Accordingly, a compressible foam between the fiber and bottom of the U-groove, as shown in FIG. 5, may be employed to clamp the fiber against the V-groove block With reference now to FIG. 6, there is shown another illustrative passive alignment of a fiber array with fiber core line according to an aspect of the present disclosure. More specifically, illustrated is a passive alignment for fiber arrays where the fiber core line is in the V groove (meaning the fiber core line is between the top and bottom of the fiber V groove block). In this case we can't use a U groove but need a pedestal or pillar instead. This pillar is formed by removing the top layers by any of a variety of known methods.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An apparatus, comprising:
    a photonic chip including a planar surface and a pillar on the planar surface;
    a fiber v-groove block having a first v-groove, wherein the first v-groove is aligned with the pillar such that the pillar is at least partially within the first v-groove; and
    a rod disposed within the first v-groove between the pillar and the fiber v-groove block,
    wherein the fiber v-groove block further comprises a second v-groove, and wherein the apparatus further comprises an optical fiber disposed at least partially within the second v-groove.

2. The apparatus of claim 1, wherein the rod is a first rod, and wherein the fiber v-groove block further comprises a third v-groove, wherein the second v-groove is between the first and third v-grooves, and wherein the apparatus further comprises a second rod disposed at least partially within the third v-groove.

3. The apparatus of claim 1, wherein the optical fiber is in contact with the planar surface of the photonic chip.

4. The apparatus of claim 1, further comprising a compressible foam between the optical fiber and the photonic chip.

5. An apparatus, comprising:
    a photonic chip including a planar surface and a pillar on the planar surface;
    a fiber v-groove block having a first v-groove, wherein the first v-groove is aligned with the pillar such that the pillar is at least partially within the first v-groove; and
    a rod disposed within the first v-groove between the pillar and the fiber v-groove block,
    wherein the fiber v-groove block has a first end proximate the photonic chip and a second end distal the photonic chip, and wherein the optical fiber is recessed from the first end.

6. The apparatus of claim 5, further comprising a lid, wherein the optical fiber is between the fiber v-groove block and the lid, and wherein the lid is recessed from the first end of the fiber v-groove block.

7. The apparatus of claim 5, further comprising a lid, wherein the optical fiber is between the fiber v-groove block and the lid, and wherein the lid has a thinned portion proximate the first end of the fiber v-groove block and a thick portion thicker than the thinned portion proximate the second end of the fiber v-groove block.

8. An apparatus, comprising:
    a photonic chip including a planar surface and a pillar on the planar surface;
    a fiber v-groove block having a first v-groove, wherein the first v-groove is aligned with the pillar such that the pillar is at least partially within the first v-groove and such that the pillar is in contact with a first side and a second side of the v-groove; and
    a rod disposed within the first v-groove between the pillar and the fiber v-groove block.

9. The apparatus of claim 8, wherein the fiber v-groove block further comprises a second v-groove, and wherein the apparatus further comprises an optical fiber disposed at least partially within the second v-groove.

10. The apparatus of claim 9, wherein the rod is a first rod, and wherein the fiber v-groove block further comprises a third v-groove, wherein the second v-groove is between the first and third v-grooves, and wherein the apparatus further comprises a second rod disposed at least partially within the third v-groove.

11. The apparatus of claim 9, wherein the optical fiber is in contact with the planar surface of the photonic chip.

12. The apparatus of claim 9, further comprising a compressible foam between the optical fiber and the photonic chip.

13. The apparatus of claim 9, further comprising a lid, wherein the optical fiber is between the fiber v-groove block and the lid, and wherein the lid is recessed from an end of the fiber v-groove block.

14. The apparatus of claim 9, further comprising a lid, wherein the optical fiber is between the fiber v-groove block and the lid, and wherein the lid has a thinned portion proximate a first end of the fiber v-groove block and a second portion thicker than the thinned portion proximate a second end of the fiber v-groove block.

* * * * *